INVENTOR.
Lubomyr O. Hewko
BY
Robert L. Spencer
ATTORNEY

Nov. 8, 1966 L. O. HEWKO 3,283,614
FRICTION DRIVE MECHANISM
Filed April 10, 1963 2 Sheets-Sheet 2

INVENTOR.
Lubomyr O. Hewko
BY
Robert L. Spencer
ATTORNEY

United States Patent Office 3,283,614
Patented Nov. 8, 1966

3,283,614
FRICTION DRIVE MECHANISM
Lubomyr O. Hewko, Warren, Mich., assignor to General Motors Corporation, Detroit, Mich., a corporation of Delaware
Filed Apr. 10, 1963, Ser. No. 272,157
2 Claims. (Cl. 74—798)

This invention relates to friction drives and more particularly to a planetary friction drive particularly suited for applications where noise and vibration must be kept to a minimum. The speed reducer disclosed herein is outstandingly quiet, vibration free and efficient and is ideally suited for use in underwater craft such as submarines or any other applications where quiet operation is of utmost importance. The friction drive transmits torque very efficiently by the smooth and continuous tractive forces within the lubricated metallic rolling contacts and thereby prevents development of periodic vibratory disturbances and serves as an effective vibration dampener in the drive line.

The drive mechanism is arranged such that all radial and axial forces are internally balanced within the rolling bodies and avoids the need for thrust washers. This feature further facilitates vibration-free operation and noise reduction. Additional improved features of this planetary friction drive include: the particular shape and arrangement of the rolling bodies, the means for generating and amplifying the required contact normal loading of the friction members, and improvement of fatigue durability of the rolling contacts in a unique way.

In planetary gear drives, due to intermittent tooth action, unavoidable tooth-mesh frequency excitations arise which result in severe torsional and axial vibrations of the drive line. Also the necessity for external grounding of the thrust and radial forces in a gear set provides a direct path for vibrations to be transmitted through the housing to the surrounding environment. These characteristics render planetary gear sets undesirable in applications where gear noise and general vibration levels attributed normally to speed reducers are objectionable.

As stated, applicant's friction planetary gear reducer is quiet in operation, and can be used in applications where necessary noise limitations prevent use of planetary gear speed reducers.

Among the novel features of this planetary friction speed reducer is the provision of two suns for splitting the input torque to the assembly, the arrangement providing for radial motion of the planet shafts and friction rollers with respect to the planet carrier, the torque loading arrangement for applying axial thrust to the suns, and the provision of conical surfaces on the suns for contacting spheroidal shaped planet rollers.

The invention is shown in FIGURES 1 through 6 wherein.

Figure 1:
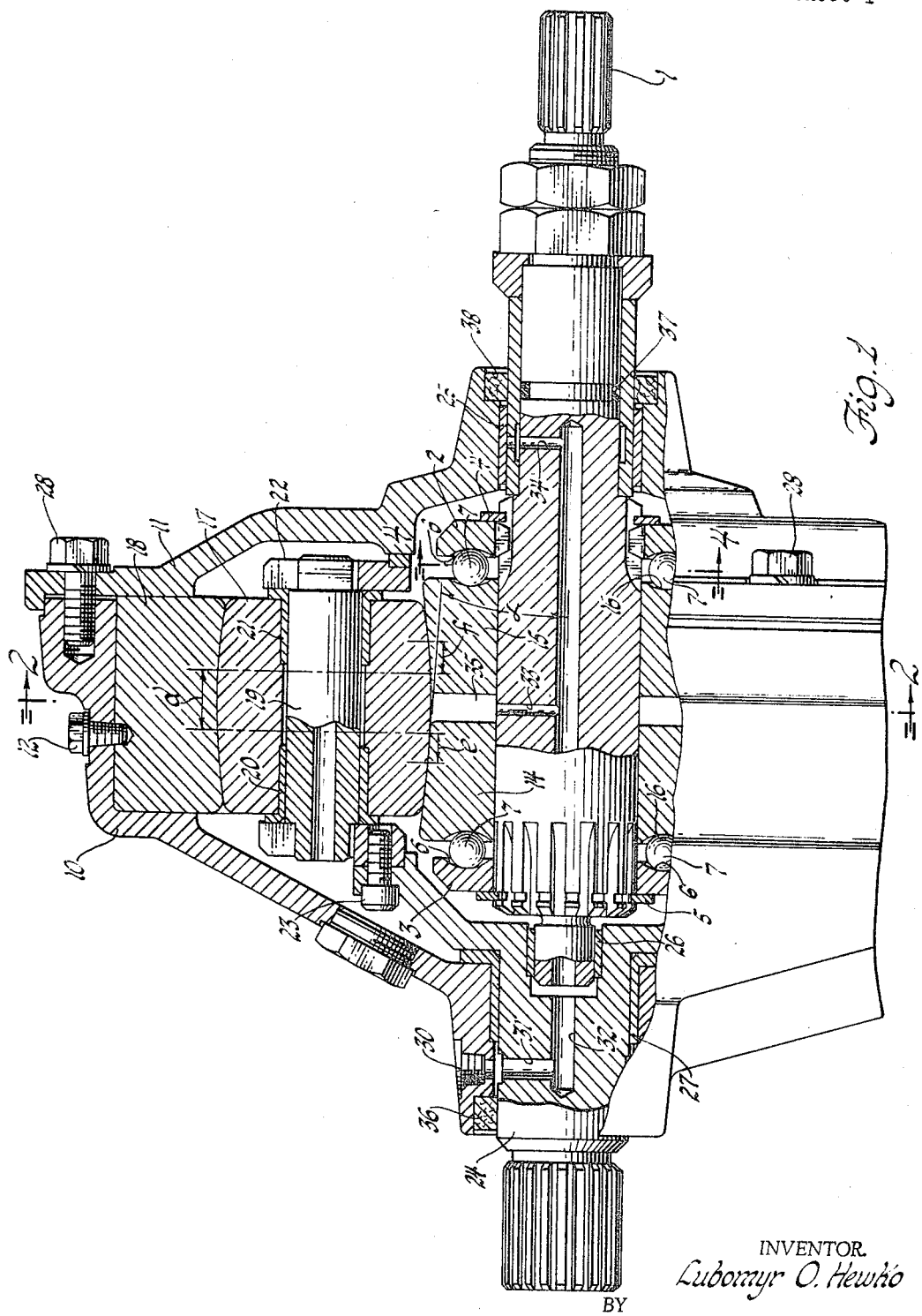
FIGURE 1 is a partial cross-sectional view of a planetary friction roller assembly constructed in accordance with the principles of this invention.

Referring to FIGURE 1, there is shown a cross section of a friction drive speed reducer operating on the principle of planetary action using traction of lubricated rolling contacts for transmitting torque.

Figure 3:
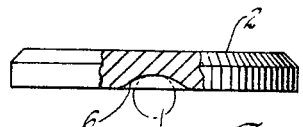
FIGURE 3 is a top plan view of one of the ball ramp devices.
Figure 4:
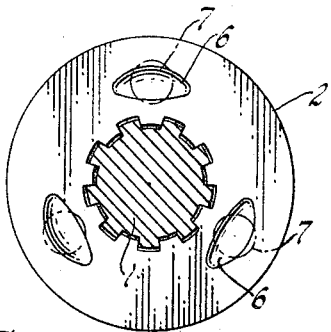
FIGURE 4 is a sectional view through one of the ball ramp devices taken along the line 4—4 of FIGURE 1.

A power input shaft 1 drives a pair of spaced torque-sensing ball ramp devices including spaced discs 2 and 3 splined to shaft 1 for rotation therewith. Snap rings 4 and 5 function as thrust reaction members for discs 2 and 3, respectively and ground the thrust reaction to input shaft 1. As best shown in FIGURES 3 and 4, disc 2 is provided with a plurality of ball ramps 6, each ramp having a ball 7 therein. As shown, the ramps 6 are of irregular configuration for purposes hereafter more fully explained. A pair of spaced suns 14 and 15 are supported upon input shaft 1, the suns being axially movable and angularly rotatable with respect to shaft 1. Each sun is provided with ball ramps 16 in the end thereof for receiving balls 7, the ramps in the end of the suns being of the same shape as the ramps found in discs 2 and 3, respectively. The contact surfaces of the suns 14 and 15 each constitutes straight cones having a cone angle $\alpha$, preferably of the order of 5 degrees.

A plurality of planets 17 (preferably six in number) are positioned for frictional contact with the two spaced suns 14 and 15 and a ring 18. The periphery of or contact surface of the pinions is spheroidal in shape and contacts the straight cone friction surfaces of the spaced suns 14 and 15. Ring 18 is supported in housing 10 and end cover 11 and is fixed against rotation by means of a series of dog screws 12 in housing 10. Each planet 17 is mounted upon a shaft 19 and rotatably supported on shaft 19 by means of sleeve bearings 20, 21. Shaft 19 is supported in a planet carrier 22 bolted to a power delivery shaft 24 by means of bolts 23. Power input shaft 1 is rotatably supported in housing cover 11 by means of a sleeve bearing 25 and is piloted in power delivery shaft 24 and supported therein by a sleeve bearing 26. Power delivery shaft 24 is rotatably supported in housing 10 by means of sleeve bearing 27. Housing cover 11 is detachably secured to housing 10 by means of bolts 28.

Oil under pressure is supplied for cooling and lubrication purposes through a port 30 in housing 10, passages 31, 32, 33 and 34 in shafts 24 and 1, the passage 33 being aligned with the space 35 between suns 14 and 15 to assure cooling and lubrication of the rolling friction surface of the planet 17, the cone surfaces of suns 14 and 15, and the friction surface of ring 18. Suitable oil seals 36, 37 and 38 prevent leakage of oil from the interior of the housing along shafts 24 and 1.

Figure 2:
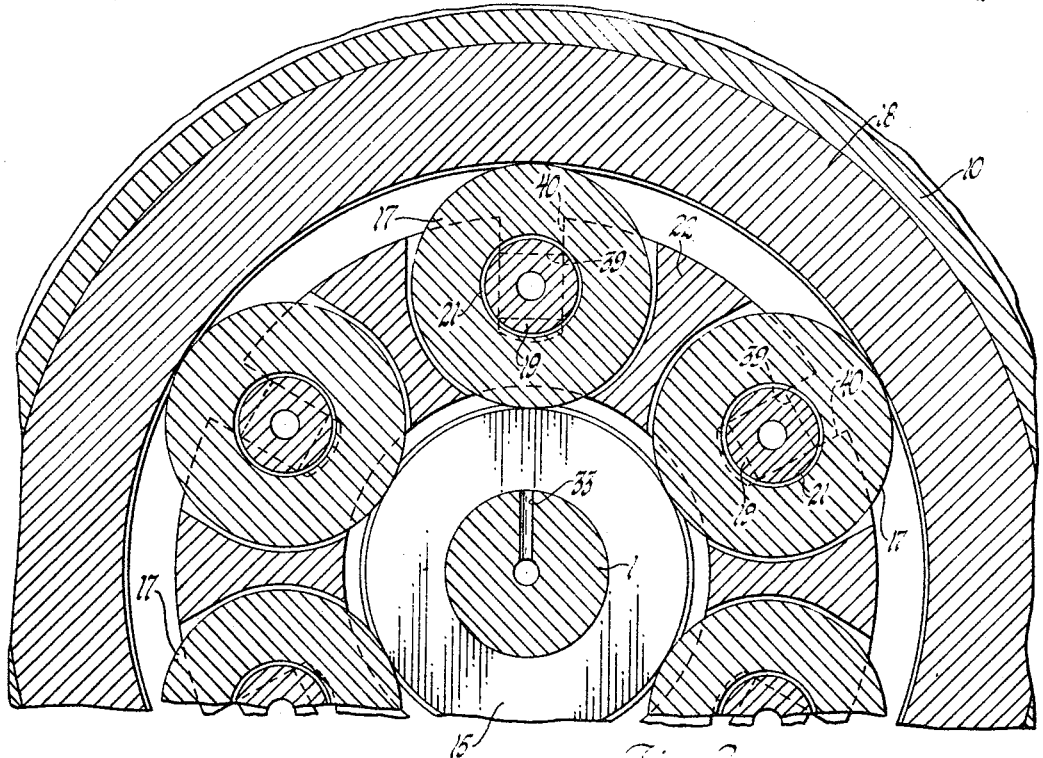
FIGURE 2 is a sectional view taken along the line 2—2 of FIGURE 1.

As shown in FIGURE 2, the ends of the planet pinion shafts 19 are of square configuration as indicated at 39 to fit in rectangular slots 40 formed in planet carrier 22. Thus, both ends of planet shafts 19 are free to move radially but not tangentially with respect to carrier 22.

Figure 5:
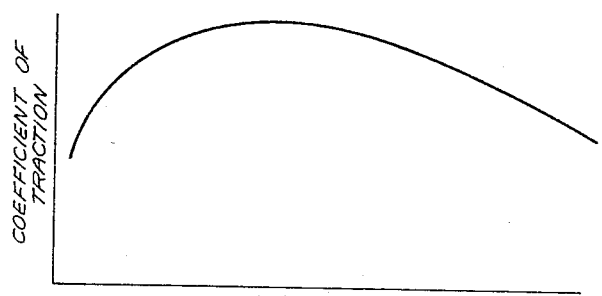
FIGURE 5 is a graph illustrating the relationship between the normal load applied to the rolling members and the coefficient of traction between the rolling members.

Referring to FIGURE 5, the curve illustrates the relationship between the coefficient of traction of the rolling friction contact surfaces and the normal load applied to such surfaces. Thus, at low normal loads and at high normal loads the coefficient of traction is relatively low, while at intermediate normal loads the coefficient of traction is relatively high. It will be apparent, therefore, that at low normal loads and very high normal loads, since the traction is relatively low, a greater normal load is required at the contact surfaces to prevent slippage of the contact surfaces for a given torque load than is required at intermediate loads where the coefficient of traction is relatively high. From the shape of the coefficient of traction curve, the variable curvature ball ramps 6 may be calculated and designed to apply adequate axial thrust to the suns 14–15 to generate sufficient normal load to the rolling contact surfaces to prevent slippage of these surfaces and at the same time prevent overloading in a tangential direction or development of excess normal loading of the rolling contact surfaces for any changes in the torque being transmitted. The variable curvature of ramps 6 therefore contribute to long useful roller life by developing just sufficient normal loading of the roller contact surfaces to prevent slippage irrespective of variation or torque being transmitted and avoids excess normal loading of the friction surfaces irrespective of increase or decrease of torque being transmitted.

It will be understood that power input from shaft 1 is equally divided between sun rollers 14 and 15, the power being transmitted thereto by way of discs 2 and 3 driven by shaft 1, and balls 7. Due to the load on shaft 24 and carrier 22 resisting rotation of the carrier 22, the balls 7 ride up on ramps 6 and apply an axial thrust to suns 14 and 15 tending to move the suns axially toward each other on shaft 1. The cone surfaces of suns 14 and 15 contacting the spheroid surface of planet 17 apply a radial force component to the planet tending to force the planet radially outwardly against reaction ring 18. The contact loading of the friction surfaces is torque responsive.

Figure 6:
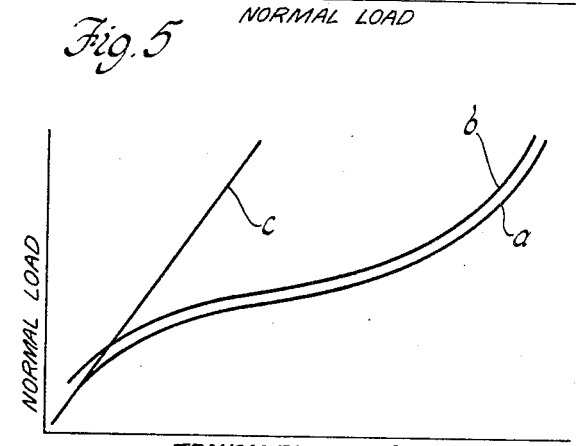
FIGURE 6 is a graph illustrating the relationship of transmitted torque and normal load.

Referring to FIGURE 6, curve "a" shows the desired contact load for various values of transmitted torque, curve "b" shows the contact normal load generated by the variable curvature ramp surface 6, and curve "c" shows the load generated by use of straight ball ramps in the torque responsive torque loading mechanism. It is apparent that the use of a straight ball ramp on the discs and suns will produce excess normal contact loading of the rolling friction surfaces and low fatigue life and efficiency of the speed reducer assembly. As the torque being transmitted decreases, the balls are caused to roll back on the ball ramps by the controlled radial spring rate of the planetary ring to relieve the contact load. The ability of the device to automatically vary the normal contact loading of the rolling friction surfaces with respect to both the torque being transmitted through the speed reducer and coefficient of traction variations greatly increases the fatigue life of the rolling contact members, because the life varies as a power of the contact load. It also reduces the required size of a unit for a given torque capacity.

It should be further noted that the assembly uses two sets of ball ramp torque loading assemblies in contrast to a single ball ramp torque loading assembly. This is an important feature since use of only a single torque loader will result in intolerable skidding of one of the suns through the ramp wind up angle before adequate contact load can be generated.

Referring further to FIGURE 1, an additional feature of this design is that the ring-planet contact area "d" occurs at the center portion of the spheroidal planet 17, while the planet-sun contacts "e" and "f" are displaced or located axially outwardly on the planet roller from the contact of the roller and ring area "d" and thus are not subject to cumulative fatigue cycles of ring stress magnitude. In other words, individual contact tracks "d," "e" and "f" are subject only to one stress cycle per planet revolution, resulting in longer useful life. A similar design with the ring and sun contacting the planet along the same track, for example, track "d" would have a considerably shorter durability since the useful life varies as a power of stress.

In addition to the extended durability of the planet accomplished by the spaced contact tracks "d," "e" and "f," the sun surface material is also efficiently utilized due to the axial motion of the sun contact with respect to the planet roller. As a result of this axial motion the sun-planet contact is caused to roll on a new track on the sun periphery for each load setting, further reducing cumulative stress cycling of the same track on the sun and increasing durability.

There has been described four outstanding features which remarkably increase the useful life of this friction drive. First, the normal load on the contacts is varied in proportion to torque requirement such that the contact life is used up only at a very slow rate due to light normal loads. Secondly, because the input torque is split between the two suns the normal load, at the critical sun contact is reduced by one-half. Thirdly, the geometry of the rolling bodies is such that the rolling contact tracks between the two suns and the planet and ring all lie in different planes, which eliminates the combined stress cycling and allows better surface durability. Fourthly, due to substantial axial movement of the suns with respect to the planets, the sun-planet contact is caused to roll along a new track on the sun for each level of torque thus further reducing cumulative stress cycling of the same sun surface.

I claim:

1. A friction drive planetary unit comprising a first member having an annular contact surface, a pair of relatively axially movable second members each having an annular contact surface, a carrier, a planet having an annular contact surface, means supporting said planet on said carrier for rotation about the planet's axis and for radial movement relative to said carrier, a portion of the contact surface of said planet contacting a portion of the annular contact surface of said first member to provide only one rolling track between said planet and said first member whose axial width is a function of planet and first member load, a portion of the annular contact surface of said planet also contacting a portion of the annular contact surface of each of said second members to provide only one rolling track between said planet and each of said second members whose axial width is a function of planet and second member load, means operatively connected to said second members operable to urge relative axial movement between said second members to apply a load to said contacting surfaces and all of said rolling tracks sufficiently axially spaced relative to each other to prevent any rolling track overlap under load so that each said rolling track is never subjected to more than one stress cycle per planet revolution.

2. A friction drive unit comprising a ring having an annular contact surface, a pair of relatively axially movable suns each having an annular contact surface, a carrier, a planet having an annular contact surface, means supporting said planet on said carrier for rotation about the planet's axis and for radial movement relative to said carrier, a portion of the annular contact surface of said planet contacting a portion of the annular contact surface of said ring to provide only one rolling track between said planet and ring whose axial width is a function of planet and ring load, a portion of the annular contact surface of said planet also contacting a portion of the annular contact surface of each of said suns to provide only one rolling track between said planet and each of said suns whose axial width is a function of planet and sun load, all of said rolling tracks sufficiently axially spaced apart relative to each other to prevent any rolling track overlap under load so that each said rolling track is never subjected to more than one stress cycle per planet revolution, torque transmitting means operatively connected to said suns including a torque loading device having an antifriction element and a ramp said, ramp having a varying inclination for cooperating with said antifriction element to urge relative movement between said suns to apply a normal load to said contacting surfaces varying both as function of torque transmitted and as a function of the coefficient of traction between said contact surfaces and of a magnitude just sufficient to prevent slippage of said contacting surfaces throughout the torque range.

References Cited by the Examiner

UNITED STATES PATENTS

| Re. 18,175 | 9/1931 | Erban | 74—798 |
|---|---|---|---|
| 1,017,911 | 2/1912 | Rennerfelt | 74—798 |
| 1,683,715 | 9/1928 | Erban | 74—208 |
| 2,076,057 | 4/1937 | Almen | 74—208 |
| 2,132,726 | 10/1938 | Ehrlich | 74—208 |
| 2,427,253 | 9/1947 | Browne | 74—798 |
| 2,913,932 | 11/1959 | Oehrli | 74—796 |
| 2,931,235 | 4/1960 | Hayward | 74—208 X |
| 2,938,409 | 5/1960 | Bucalo | 74—798 |

FOREIGN PATENTS 345,178 12/1921 Germany.

DAVID J. WILLIAMOWSKY, *Primary Examiner.*

DON A. WAITE, *Examiner.*

T. C. PERRY, *Assistant Examiner.*